UNITED STATES PATENT OFFICE 2,660,167

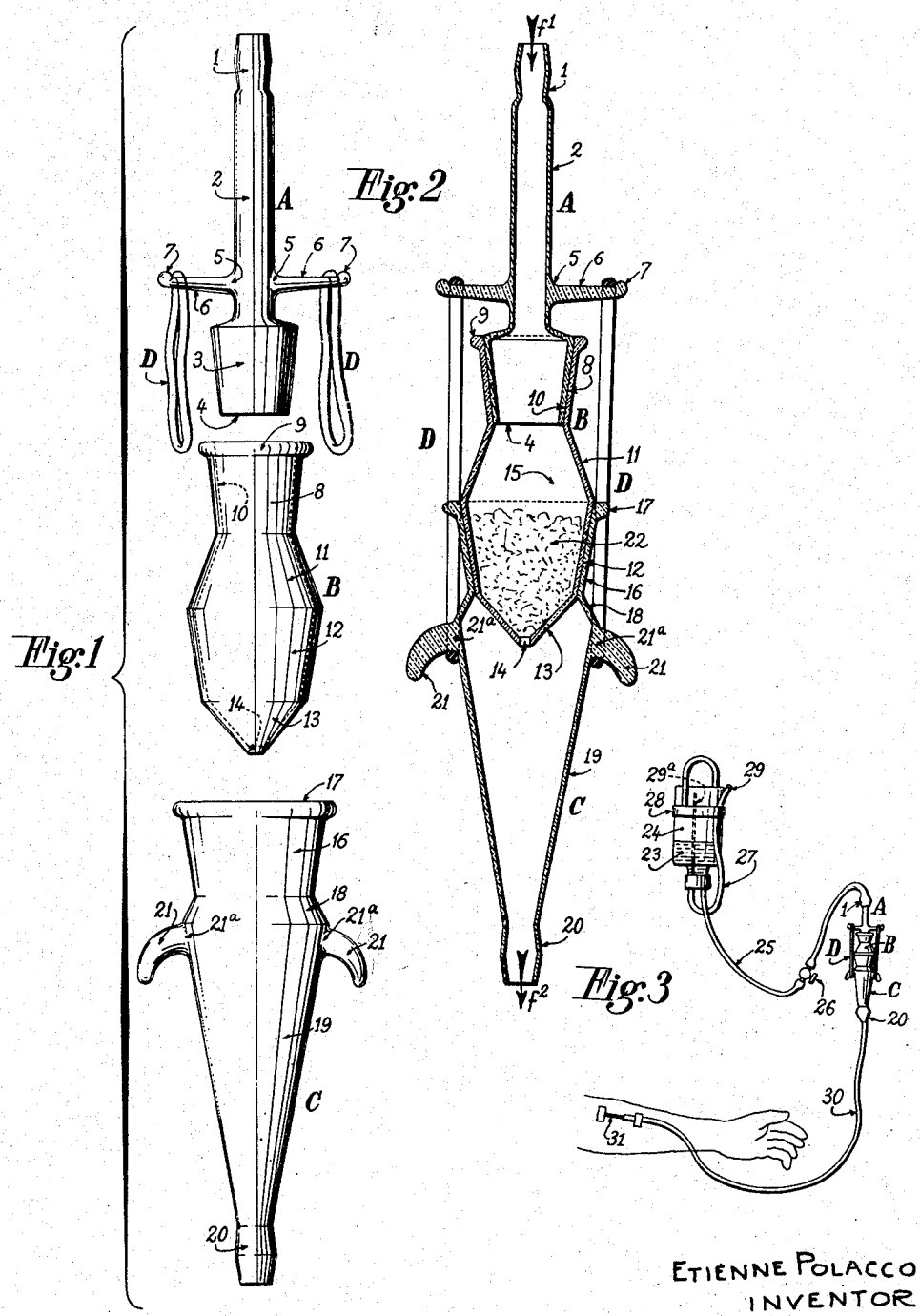

FILTER

Etienne Polacco, Paris, France

Application May 27, 1952, Serial No. 290,231

Claims priority, application France June 2, 1951

9 Claims. (Cl. 128—214)

The present invention has for its object to provide an improved filter for liquids injectable in human and animal bodies through the veins or otherwise, and in particular for injection of blood, plasma and lysats (liquids from the maceration of albuminous organs and others), in the course of blood transfusions and the like.

The invention has more particularly for its object to provide a filter for such injectable liquids of very simple construction composed of a small number of separable elements that facilitates sterilization and inspection of their surfaces and may be assembled in a thoroughly fluid-tight manner and separated almost instantaneously in the course of an injecting operation, thereby permitting immediate precautions to be taken in case of emergency.

Other advantages and features of the invention will be apparent from the ensuing description.

In the accompanying drawing:

Fig. 1 shows an exploded view of the component parts of the filter in accordance with the invention.

Fig. 2 is a longitudinal section of the assembled filter provided with a filter plug.

Fig. 3 shows, by way of example, the filter employed with a blood transfusion apparatus.

In the illustrated embodiment, the filter is composed of three principal parts A, B and C adapted to be fitted together and maintained assembled by rings D of rubber or like material or by springs.

The three pieces A, B and C are coaxial bodies of revolution and are open from end to end along their axis. All three may be made from a transparent material such as glass or any other strong synthetic substance immune from attack by the substances to filter or porcelain or any other material that is transparent, translucid or even opaque.

The material used may or may not be the same for the three pieces.

The piece A constitutes a connection piece for the supply of the fluid to filter. At its top end it is provided with a nozzle 1 and the latter is followed by a cylindrical portion 2 that is enlarged at 3 into a frusto-conical connection portion whose diameter decreases down to the open end 4. The outer frusto-conical surface of the connection portion 3 is perfectly smooth. This smooth surface may be obtained by means of the operation commonly termed lapping in which the surface of the work is improved by the grinding action of loose abrasive.

Two radial arms 6 are welded at 5 to the cylindrical portion 2, these arms being terminated at 7 by portions slightly raised in the shape of hooks.

The intermediate or central piece B constitutes a filter chamber and comprises from top to bottom in coaxial superposed relationship:

(a) A downwardly tapered frusto-conical connection portion 8 reinforced at its top rim by a lip 9, the inner surface 10 of this portion 8 being perfectly smooth, for example lapped. The taper of the inner surface 10 is exactly the same as that of the outer surface of the tapered connection portion 3 of the part A of the filter so that the portion 8 may fit in a completely fluid-tight way on the connection 3.

(b) A portion 11 of frusto-conical or like shape downwardly flared.

(c) A connection portion 12 also frusto-conical downwardly tapered the outer surface of which is frusto-conical and exactly smooth, for example lapped.

(d) An end portion 13 forming a conical funnel downwardly tapered and provided with a lower aperture 14 of small bore (of about one to two millimetres diameter).

As can be seen, these three portions 11, 12 and 13 form a filter chamber 15.

Finally, the connection end piece C (or flow reservoir) has a substantially very elongated conical shape and includes an upwardly flared frusto-conical upper connection portion 16 the upper rim of which is provided with an outer reinforcing lip 17. The inner surface of said portion 16 is exactly conical and smooth, for example lapped, its taper being exactly equal to that of the outer surface of the portion 12 of the piece B, thereby permitting a highly fluid-tight assembly of these two pieces B and C.

Below the portion 16, the part C is downwardly flared at 18 over a short length and then is extended by a long downwardly tapered portion 19 of frusto-conical or like shape terminated at its small end by a connection nozzle 20. This part C includes adjacent the largest part of the conical portion 19, two external radial arms 21, attached by welding at 21a and curved towards the connection nozzle 20 so as to form two hooks.

Fig. 2 shows the filter assembled. In the chamber 15 is lodged a well-rammed plug of gauze 22. The part A is then hermetically fitted into the part B and the latter is then hermetically fitted into the part C. Preferably, the connection portions are slightly greased before assembly with a very thin film of petroleum jelly or paraffin oil.

The assembly is elastically held together by elastic means comprising two removable rings D that are stretched between the arms 6 and 21 brought in line in the course of assembly.

The filter is then ready for use. The liquid to be filtered is then admitted in the direction of the arrow $f^1$ (Fig. 2) through the nozzle of the part A and the products to be filtered off are retained by the plug 22 through which the liquid passes. It will be noticed that this plug when soaked with the liquid adapts itself very closely to the frustoconical portions 12 and 13 of the part B of the filter and thereby ensures a perfect filtration without risk of the liquid flowing between the plug 22 and the inner surface of the part B of the filter.

The filtered liquid passes, drop by drop, through the aperture 14 and flows in the direction of arrow $f^2$ through the outlet nozzle 20.

Fig. 3 illustrates an application of the filter to a blood transfusion operation. The liquid 23, to be injected after it has been filtered, is contained in a vessel or flask 24 at a level higher than the filter. The lower connection of this vessel is connected by a flexible tube 25 of rubber or like flexible and elastic material to the nozzle 1 of the filter. A tap 26 is included in this tube.

An auxiliary tube 27 puts the top of the vessel in communication with the atmosphere, said tube 27, held against the vessel 24 by a collar 28, opens out into the exterior through its upper end 29 and into the vessel through a hollow needle 29ª.

Lastly, the discharge nozzle 20 of the piece C is connected by a flexible and elastic tube 30 to the injection needle 31.

The liquid 23 flows, therefore, through the filter and passes drop by drop, through the aperture 14 of the part B and collects in its bottom part C where the level rises if the flow through the needle 31 is less than the flow into the filter. The input flow is regulated so as to maintain in the part C a substantially constant reserve of filtered liquid.

The filter in accordance with the invention has the following principal advantages:

(a) It is very easily cleaned, washed and sterilized, owing to its being composed of, preferably, a transparent material, which makes it very easy to observe the state of the surfaces. Moreover, owing to the fact that it can be taken apart, these surfaces are very easy to get at.

(b) The liquid is filtered through a plug (wick or compress) packed at 22. Hence, since the filter may be taken apart, if the filter becomes clogged the intermediate part B may be easily replaced by an identical part containing a new plug or the used plug may be removed with sterilized tweezers and replaced by another sterilized plug.

(c) Owing to the very long shape of the piece C there is little likelihood of this piece becoming choked up. However, if such a choking of the part C happens to cause a rise in the liquid level up to the aperture 14 of said part B, after having stopped the supply of liquid through the tube 25 by means of the tap 26, it is possible, by slightly separating the parts B and C, to let a little air in the part C over the liquid it contains, and the liquid level in this part C rapidly drops. The two parts B and C are then very easily fitted together without further dismounting the filter.

(d) In the event of a quantity of air entering the supply tube 25 for any reason (during the exchange of the flask 24, for example) it is possible, by clamping the outlet tube 30 and separating the two parts B and C, to let the air through the aperture 14. As soon as the liquid arrives, the part C is filled up to a suitable level, the parts B and C are fitted together, the clamp is removed from the tube 30, and the transfusion resumed without danger.

(e) The flow may be either rapid or slow without this adversely affecting the filtration.

The invention is not limited to the details of construction described and illustrated in the accompanying drawing, which have been given solely by way of example.

Having now described my invention what I claim as new and desire to secure by Letters Patent is:

1. In a filter for liquids injectable in human and animal bodies, said filter being adapted to be interposed between a supply pipe of the liquid to be filtered and a discharge pipe for the filtered liquid, in combination: a central piece of revolution and open from end to end along its axis and adapted to contain a removable filter plug, two connection pieces that are also bodies of revolution and open from end to end along their axes and are adapted to connect said central piece respectively to said supply pipe for the liquid to be filtered and to said discharge pipe of the filtered liquid, the three pieces being provided with interfitting frusto-conical smooth connection portions concentric with said axes, said connection pieces being respectively in interfitting engagement with said central piece at either end thereof by means of said connection portions and at least one elastic device for elastically holding together these pieces in interfitting engagement at their connection portions in a hermetically sealed dismountable coaxial assembly.

2. Filter as claimed in claim 1, in which said three pieces are of a transparent material.

3. Filter as claimed in claim 1, in which said three pieces are of a translucid material.

4. Filter as claimed in claim 1, in which said connection portions have a lapped surface.

5. In a filter for a liquid injectable in human or animal bodies, said filter being adapted to be interposed between a supply pipe for the liquid to be filtered, and a discharge pipe for the filtered liquid, in combination: a first connection piece of revolution about an axis and open from end to end along said axis and provided at one of its ends with a nozzle for its fluid-tight connection to said supply pipe and at its other end with a smooth frusto-conical male portion; an intermediate piece also of revolution about its axis and forming a filter chamber that is open at one end of said intermediate piece through a smooth frusto-conical aperture complementary to said frusto-conical male portion and at the other end of said intermediate piece through a hole of small bore that allows a drop by drop discharge of the filtered liquid, a portion of the outer surface of said intermediate piece adjacent the lower end thereof being smooth and frusto-conical in shape; a second connection piece of elongated shape also of revolution about its axis and open from end to end along this axis and comprising at one of its ends a smooth female frusto-conical portion complementary to said smooth frusto-conical portion of the outer surface of said intermediate piece and at its other end a nozzle for its connection to said discharge pipe, said smooth male frusto-conical portion of said first connection piece and said smooth female frusto-conical portion of said second connection piece being respectively in interfitting engagement with said smooth frusto-conical aperture and said smooth frusto-conical portion of said outer surface of said intermediate piece; and elastic devices for elastically holding together said two connection pieces and said intermediate piece in interfitting engagement at said smooth frusto-conical portions in a hermetically sealed dismountable coaxial assembly, said elastic means being connected to each of said connection pieces.

6. Filter as claimed in claim 5, in which said two connection pieces are provided externally with a similar number of radially extended arms forming hooks, said elastic devices consisting of as many elastic rings as there are radially extended arms on each connection piece for the elastic holding together of the dismountable assembly, each one of said rings being connected to one of the arms of one of said connection pieces and to one of the arms of the other connection piece.

7. Filter as claimed in claim 6 in which there are provided two elastic rings and, on each connection piece, two external arms diametrically opposite.

8. Filter for liquids injectable in human and animal bodies and adapted to be interposed between a supply pipe for the liquid to be filtered and a discharge pipe for the filtered liquid, said filter being composed of the combination of a central piece of revolution open from end to end along its axis, a filter plug housed in said central piece, two connection pieces also of revolution about their axes and open from end to end along their axes for connecting said central piece respectively to said supply pipe for the liquid to be filtered and to said discharge pipe for the filtered liquid, these three pieces being provided with interfitting frusto-conical connection portions that are smooth and concentric with said axes, said connection pieces being respectively in interfitting engagement with said central piece at either end thereof by means of said connection portions, and at least one elastic device for elastically holding together these pieces in interfitting engagement at said connection portions in a hermetically sealed dismountable coaxial assembly, said elastic device being attached to each of said connection pieces.

9. Filter installation for liquids injectable in human and animal bodies, this installation comprising in combination: a vessel with a head of the liquid to be filtered and provided with a lower discharge aperture; a first flexible and elastic tube connected to said aperture; a filter including a central piece of revolution open from end to end along its axis which is vertical, a filter plug housed in this central piece, a first connection piece also of revolution and open from end to end for connecting the upper end of said central piece to said first tube, a second connection piece also of revolution open from end to end and connected to the lower end of said central piece, said three pieces being provided with interfitting frusto-conical smooth connection portions concentric with said axes, said connection pieces being respectively in interfitting engagement with said central piece at either end thereof by means of said connection portions, and elastic devices for elastically holding together these pieces in interfitting engagement at said connection portions in a hermetically sealed dismountable coaxial assembly, said elastic devices being connected to each of said connection pieces; a second flexible and elastic tube for the discharge of the filtered liquid connected at one of its ends to the lower end of said second connection piece; and an injection member connected at the other end of said second discharge pipe.

ETIENNE POLACCO.

References Cited in the file of this patent

UNITED STATES PATENTS

| Number | Name | Date |
|---|---|---|
| 2,202,055 | Juffa | May 28, 1940 |

FOREIGN PATENTS

| Number | Country | Date |
|---|---|---|
| 222,068 | Switzerland | Sept. 16, 1942 |